(12) United States Patent
Arisaka et al.

(10) Patent No.: US 8,611,082 B2
(45) Date of Patent: Dec. 17, 2013

(54) STORAGE DEVICE

(75) Inventors: Toshihiro Arisaka, Odawara (JP);
Daisuke Matsuka, Yokohama (JP);
Hiroshi Fukuda, Odawara (JP);
Morihiro Waizumi, Minamiashigara
(JP); Kouichirou Kinoshita, Hadano
(JP); Naoki Wada, Odawara (JP)

(73) Assignee: Hitachi, Ltd., Tokyo (JP)

( * ) Notice: Subject to any disclaimer, the term of this patent is extended or adjusted under 35 U.S.C. 154(b) by 45 days.

(21) Appl. No.: 13/325,116

(22) Filed: Dec. 14, 2011

(65) Prior Publication Data

US 2012/0155011 A1    Jun. 21, 2012

(30) Foreign Application Priority Data

Dec. 17, 2010   (JP) .................................. 2010-281138

(51) Int. Cl.
*G06F 1/16*    (2006.01)

(52) U.S. Cl.
USPC ... 361/679.34; 248/544; 312/245; 369/263.1; 360/99.06

(58) Field of Classification Search
USPC ........... 16/110.1, 428, 422; 360/78.01, 77.07, 360/246.1, 99.06; 345/419, 427; 369/30.63, 369/30.48, 30.34, 30.41, 263.1; 312/215, 312/223.2, 236, 333, 332.1, 311, 217, 245; 248/298.1, 229.1, 49, 205.1, 291.1, 248/306, 544, 27.5; 439/345, 160, 131; 361/679.31, 679.32, 679.33, 679.34, 361/679.37, 679.39, 679.46, 679.48
See application file for complete search history.

(56) References Cited

U.S. PATENT DOCUMENTS

| 2008/0298005 | A1* | 12/2008 | Deng et al. ..................... 361/684 |
| 2011/0069442 | A1* | 3/2011 | Chen et al. ............... 361/679.33 |
| 2013/0078838 | A1* | 3/2013 | Lin et al. ...................... 439/345 |

FOREIGN PATENT DOCUMENTS

| JP | 3072168 U | 7/2000 |
| JP | 2005-182936 A | 7/2005 |
| JP | 2007-046722 A | 2/2007 |
| JP | 2007-126946 A | 5/2007 |
| JP | 2009-046923 A | 3/2009 |

* cited by examiner

*Primary Examiner* — Hung Duong
(74) *Attorney, Agent, or Firm* — Mattingly & Malur, PC

(57) ABSTRACT

A storage device having a plurality of recording devices in which a decrease in vibrations from the recording devices can be achieved with a small number of parts. A storage device having a plurality of recording devices mounted therein includes a handle for inserting and withdrawing the recording device into and out of the storage device. Two holding members each include a mounting portion where the recording device is mounted and a frame extending from the mounting portion to the handle. Two protrusions are formed to extend inwardly of a region surrounded by the recording device, the handle, and the two frames. A restriction plate is disposed so as to overlap the respective surfaces of the two protrusions; and a viscoelastic body is disposed at the overlapping portion for joining the two protrusions and the restriction plate to one another.

9 Claims, 7 Drawing Sheets

STORAGE DEVICE

BACKGROUND OF THE INVENTION

1. Field of the Invention

The present invention relates to a storage device.

2. Description of the Related Art

The background art for the technique of the present invention includes Patent Document JP-2005-182936-A. The patent document describes as: "A mounting apparatus includes a buffer fixing piece 40 for providing buffers 44, 45, 46 to a first HDD 10, a holding frame 50 for holding the first HDD 10 integrated with the buffer fixing piece 40 and fixing a control board 30, a buffer fixing piece 60 for providing a buffer unit 64 to a second HDD 20 and arranging the second HDD away from a palm rest 83 in cooperation with a step 85 of a unit mounting section 84 upon mounting, and a holding case 70 holding the second HDD 20 integrated with the buffer fixing piece 60 and joined to the holding frame 50" (refer to the abstract of JP-2005-182936-A).

SUMMARY OF THE INVENTION

A storage device has a plurality of recording devices mounted therein, each of the recording devices being attached to the casing of the storage device by a holding member (canister).

The recording device is described, for example, with reference to a HDD (hard disk drive). The HDD vibrates itself by the operation of an internal actuator or a disk spindle. The vibrations are transmitted to HDDs not in operation and attached to the storage device, and vibrates the HDDs not in operation as well.

Vibrations from the HDDs not in operation overlap in a multiple manner and are transmitted, as external vibrations, to the HDD in operation. This affects the operation of the HDD in operation and leads to an undesirable effect on the input/output amount.

Further, the vibrations are also transmitted to the holding member of the HDD. Since the holding member is included in the HDD as a structural member, the transmitted vibrations vibrate the holding member in the vibration mode of the natural frequency.

JP-2005-182936-A discloses a method of suppressing the vibrations to be transmitted by providing a buffer unit between the HDD and the holding member of the HDD. However, since it is required that the buffer units are filled all the portions between the HDD and the holding member of the HDD, many buffers units are needed. Therefore the number of parts is increased.

The object of the present invention is to provide a storage device having a plurality of recording devices that suppresses the vibrations transmitted from the recording devices with a small number of parts.

To solve the problems described above, the present invention adopts the configuration as described below.

The present invention includes a plurality of means for solving the problems described above, and one of examples thereof includes a storage device having a plurality of recording devices mounted therein including;

a handle for inserting and withdrawing the recording device into and out of the storage device, a mounting portion having the recording device mounted therein, two holding members each comprising a frame extending from the mounting portion to the handle, two protrusions formed to the two frames respectively and formed so as to extend to the inside of a region surrounded by the recording device, the handle, and the two frames, a restriction plate disposed so as to overlap the surfaces of the two protrusions, and a viscoelastic body for joining the two protruding portions and the restriction plate.

The present invention provides a storage device having a plurality of recording devices that suppresses the vibrations transmitted from the recording devices with a small number of parts.

The subjects, configurations, and the advantageous effect other than those described above will become apparent according to the following description of the preferred embodiments.

DESCRIPTION OF THE PREFERRED EMBODIMENTS

In the following description for the preferred embodiments, description will be made with reference, to a RAID apparatus as a storage device, and to a HDD (hard disk drive) as a recording device, for example.

First Embodiment

Figure 1:
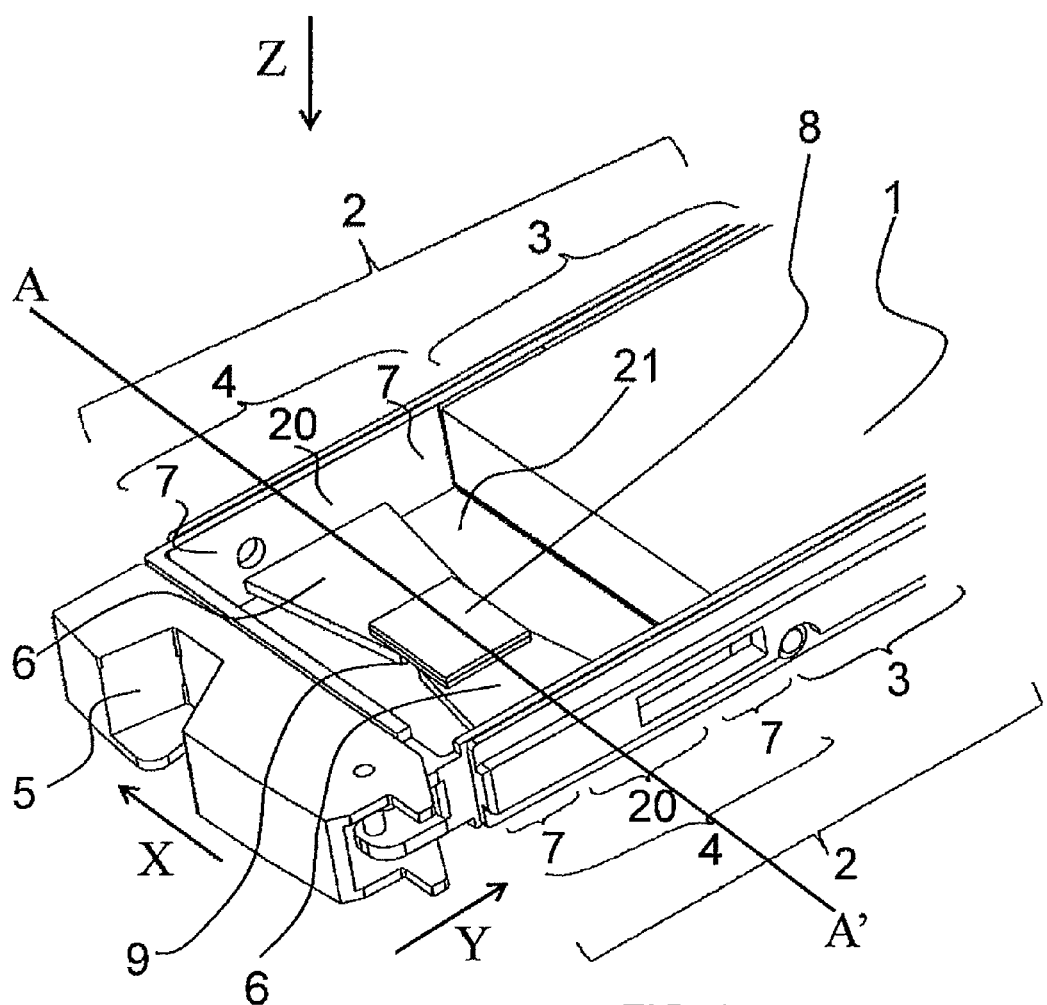
FIG. 1 is a perspective view showing a first embodiment.

FIG. 1 is a perspective view showing a first embodiment. FIG. 1 is an enlarged view of a holding member 2 for mounting a HDD 1 to a RAID apparatus. In FIG. 1, an arrow X indicates a direction substantially parallel to the direction that a protrusion portion 6 extends from a frame 4, an arrow Y indicates a direction substantially parallel to the holding member 2, and an arrow Z indicates a direction substantially perpendicular to the surface of the protrusion portion 6.

The holding member 2 has a mounting portion 3 where the HDD 1 as a recording device is mounted on, and a beam-like frame 4 extending from the mounting portion 3 to a handle 5. The frame 4 is formed of a material such as a die-cast aluminum or resin. The handle 5 is disposed at the top end of the frame 4 and gripped by an operator when the HDD 1 is inserted/withdrawn into/out of the RAID apparatus. Two holding members 2 are disposed such that surfaces opposing to each other are substantially in parallel so as to sandwich the right and left lateral sides of the HDD 1 on both sides. Protrusions 6 extending from the frame 4 towards the inside are formed integrally with the frame 4.

The protrusion portion 6 may also be manufactured separately from the frame 4 and then bonded to the frame 4. The protrusions 6 are disposed so as to direct the inside of a region 21 surrounded by the HDD 1, the handle 5, and the two frames 4. The protrusion portion 6 is formed such that its width is narrowed as it extends to the inside of the region 21.

At least one of the protrusions 6 is formed such that its width of the base portion (on the side of the frame 4) is larger than the width at the top end. In such a configuration, the cross sectional area of the protrusion portion 6 is decreased toward the top end and forming a beam whose bending stress exerts substantially equally from the base to the top end.

Further, the rotational angle at the top end of the protrusion portion 6 to the tension exerting on the top end can be made larger, and the strain in a viscoelastic body 9 to be described later can be increased.

While the protrusion is shaped as described above for making the portion for attaching the viscoelastic body 9 to be described later to the top end of the protrusions smaller (concentrating the strain to the viscoelastic body 9), the shape of the protrusion portion 6 may not necessary be narrowed as it extends to the inside since it may suffice that the viscoelastic body 9 can be held at the top end.

The protrusion portion 6 is formed to each of the two frames 4 and each formed at a substantially identical height with the bottom of the region 21. The two protrusions 6 are formed such that they do not contact each other in the region 21. That is, at least the length of one of the two protrusions 6 in the direction X in FIG. 1 is formed in length less than a half of the length of the frames 4.

The portion where the protrusion 6 is formed, that is, the portion around the base of the protrusion portion 6 is reinforced by the protrusion portion 6 and this portion is referred to as a reinforcing portion 20. The rigidity is relatively low in the portion 7 where the protrusion portion 6 is not formed and this portion tends to deform in the direction X in FIG. 1. The portion referred to as a deforming portion 7.

On the other hand, top ends of the two protrusions 6 extending inward from the base of the frames 4 are joined by a restriction plate 8. A viscoelastic body 9 is disposed to the restriction plate 8 so as to join the two protrusions 6. That is, the restriction plate 8 is provided so as to overlap the surfaces of the two protrusion portion 6. The viscoelastic body 9 is disposed to the overlap portion thereby joining the two protrusions 6 and the restriction plate 8.

Figure 2:
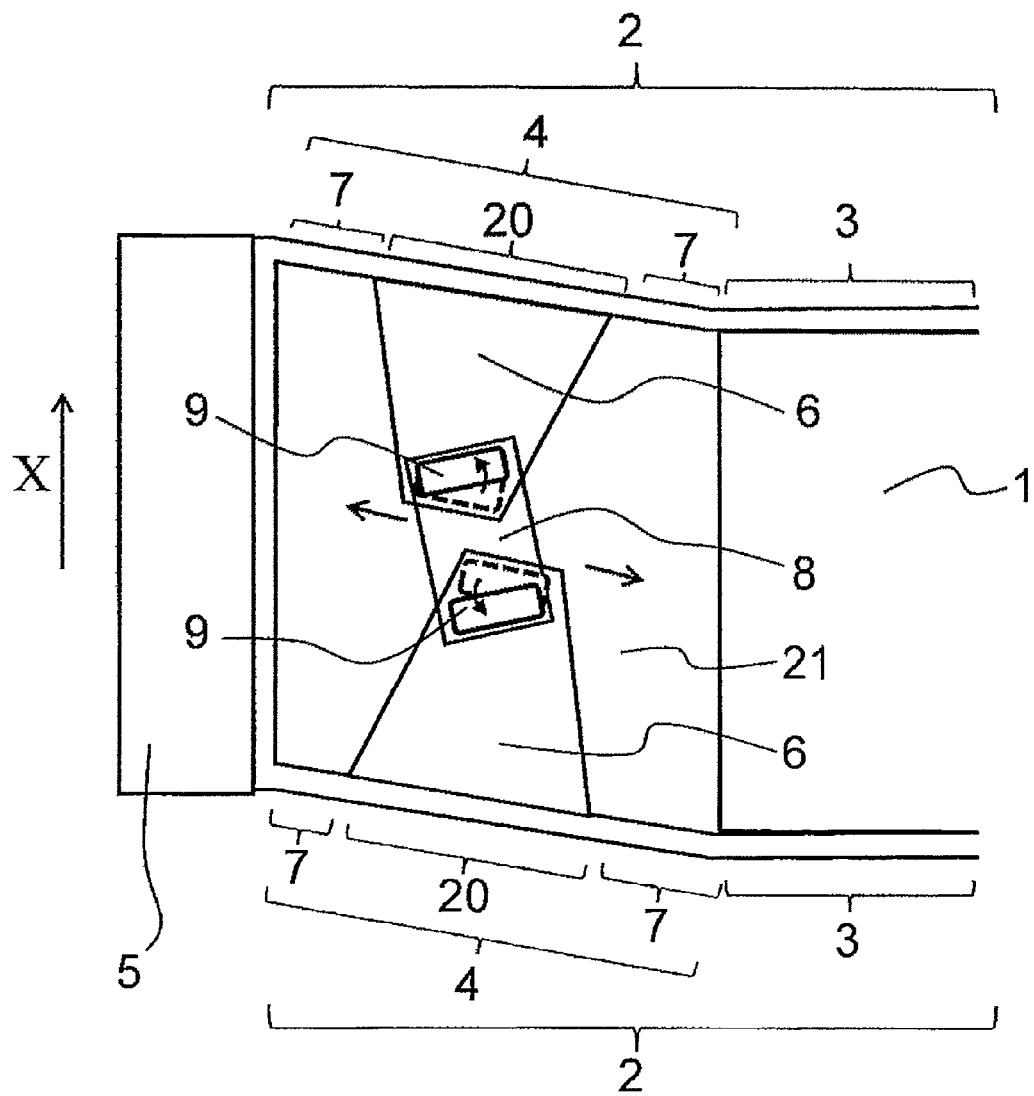
FIG. 2 is a perspective view showing the operation in the first embodiment.

As shown in FIG. 2, in the structure described above, when the handle 5 moves in the direction X with the mounting portion 3 as a fixing portion and the two frames 4 as two sides opposed to each other, each of the deforming portions 7 of the frames 4 bend to deform the frames 4 like substantially parallel leaf springs.

In this case, since each of the two protrusions 6 rotate against one another, the top ends of the two protrusions 6 recede from each other. Further, the two protrusions 6 rotate relatively. However, even when the two protrusions 6 rotate against one another, a large strain is generated in the viscoelastic body 9 is deformed with the restriction plate 8 with which the viscoelastic body 9 is restricted.

Figure 3:
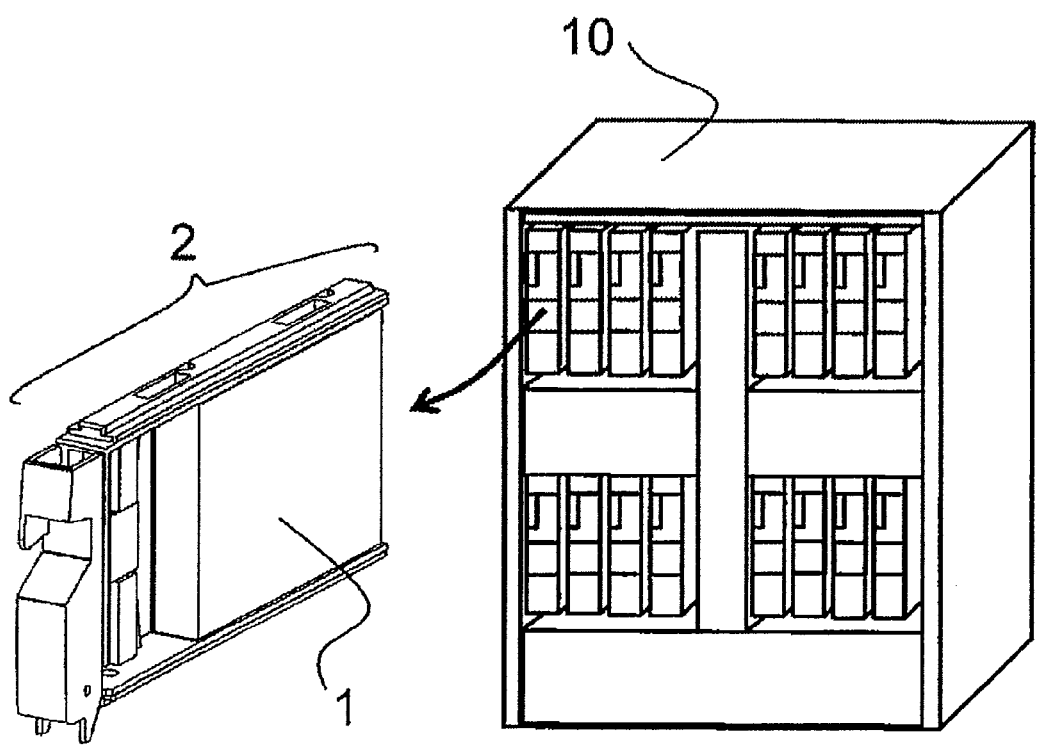
FIG. 3 is a schematic view showing an example for the entire structure of a storage device.

FIG. 3 is a view shows an entire RAID apparatus as the storage device of the first embodiment, which is a schematic view showing only the portion according to the first embodiment. A plurality of holding members 2 of the first embodiment 1 are mounted in the casing of the RAID apparatus. Each of the plurality of the HDDs 1 is mounted to each of the plurality of holding members 2 disposed to the RAID apparatus to input/output information.

The HDD 1 vibrates itself by the operation of an actuator (not illustrated) or a disk spindle (not illustrated) disposed inside thereof. The vibrations are transmitted to other HDDs 1 and the transmitted vibration vibrates the other HDDs 1 as well.

Vibrations from the other HDDs 1 overlap in a multiple manner and are transmitted to the other HDDs 1 in operation. The vibrations vibrated by the HDDs 1 and the vibrations vibrated by the other HDDs 1 generate a vibration mode. In the vibration mode, the holding members 2 are deformed as shown in FIG. 2.

In the first embodiment, when the holding member 2 is deformed as shown in FIG. 2, a large strain is generated in the viscoelastic body 9 and then the strain is converted into thermal energy, thereby decreasing the vibrations.

As described above, according to the first embodiment, vibrations transmitted from the HDD 1 as the recording device to the holding member 2 can be decreased by the small viscoelastic body 9 in view of the entire recording device. That is, the size of the viscoelastic body 9 can be decreased, therefore, vibrations of the recording device can be decreased at a reduced cost.

For the restriction plate 8, a highly rigid material such as stainless steel is preferably used. This is because most of vibration energy can be converted into heat energy with the viscoelastic body 9 by greatly deforming the viscoelastic body 9, while deforming the restriction plate 8 as small as possible. Further, a sheet-like shape damping material having adhesiveness on both surfaces is used preferably for the viscoelastic body 9.

Figure 4:
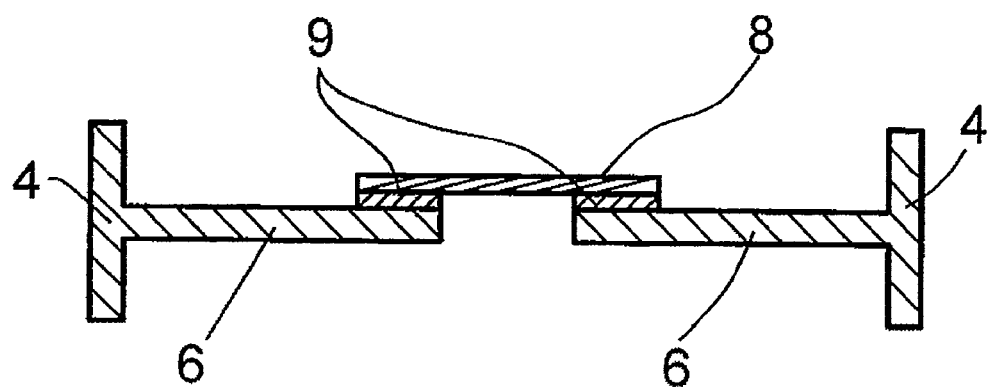
FIG. 4 shows the first embodiment along the cross section A-A' in FIG. 1 as viewed in the direction Y.

FIG. 4 is a cross sectional view along A-A' in FIG. 1 as viewed in the direction Y. As shown in FIG. 4, the structure of the first embodiment can be manufactured readily; bonding the viscoelastic body 9 at two portions on both ends on one surface of the restriction plate 8; and bonding the same to an identical upper surface or lower surface of the two protrusions 6, thereby improving the production efficiency.

Second Embodiment

Figure 5:
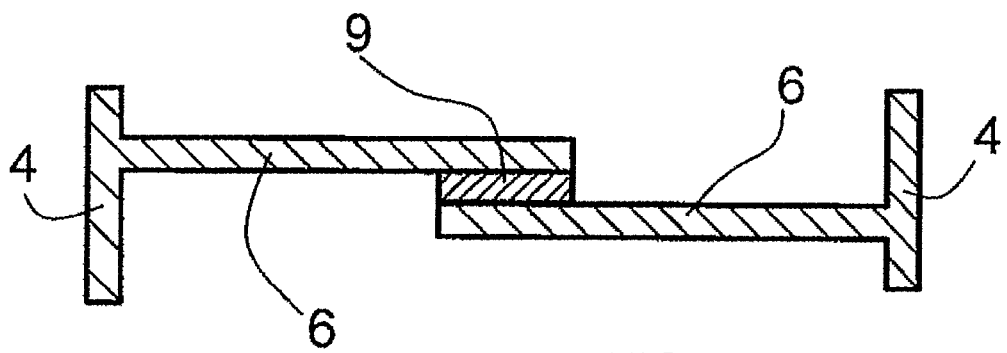
FIG. 5 shows a second embodiment along the cross section A-A' in FIG. 1 as viewed in the direction Y.

A second embodiment 2 is described with reference to FIG. 5. FIG. 5 is a cross sectional view along A-A' in FIG. 1 as viewed in the direction Y. For the second embodiment, description for identical portions with those of the first embodiment is omitted.

The second embodiment is different from the first embodiment in that the restriction plate 8 of the first embodiment is not present. Further, as shown in FIG. 5, each of the two protrusions 6 is formed inside the region 21 in such a manner as to have different height with respect to the bottom of the region 21 in the second embodiment. Further, respective top ends of the two protrusions 6 extend lengthwise toward different frames 4 such that they are alternated with each other and overlap to each other.

The length for at least one of the two protrusions 6 in the direction X in FIG. 1 is formed longer than a half of the length of the frames 4. The protrusion 6 is formed in such a manner as to have smaller width is narrowed as it extends to the inside of the region 21.

A viscoelastic body 9 is bonded to a portion where the two protrusions 6 overlap each other. That is, the viscoelastic body 9 is bonded to the two protrusions 6 such that the upper surface of the viscoelastic body 9 is bonded to the end at one of the protrusions 6's lower surface and the lower surface of the viscoelastic body 9 is bonded to the end at the other protrusions 6's upper surface. The two protrusions 6 are joined by bonding the viscoelastic body 9 as described above.

In the second embodiment 2, unlike the first embodiment, the restriction plate 8 is not present different, therefore when the two protrusions 6 rotate against one another, the viscoelastic body 9 directly receives the stress generated by the rotation. Accordingly, the deformation of the viscoelastic body 9 in the second embodiment is greater than in the first embodiment. This leads to an even more effective damping and vibrations of HDD 1 can be suppressed even further.

As described above, according to the second embodiment, vibrations by the recording device can be decreased in the same manner as in the first embodiment by overlapping the two protrusions 6 to each other without the restriction plate 8.

Further, since the restriction plate 8 is not needed in the second embodiment, the number of parts can be reduced than that of the first embodiment, and the viscoelastic body 9 can be made even smaller than that of the first embodiment since the viscoelastic body 9 is allowed to be disposed at only one position.

Third Embodiment

A third embodiment is described with reference to FIG. 6. Since the direction of an arrow X, the direction of arrow Y, and the direction of an arrow Z in FIG. 6 are identical with the directions described with reference to FIG. 1, description therefor is omitted.

In the third embodiment, without the restriction plate 8 as in the same manner as in the second embodiment, the top ends of the two protrusions 6 are joined directly with a viscoelastic body 11. However, unlikely with the second embodiment, each of the two protrusions 6 is formed inside the region 21 to be provided at a substantially equal height with respect to the bottom of the region 21.

The protrusion 6 is formed in such a manner as to have shorter width as it extends to the inside of the region 21. At least one of the protrusions 6 is formed in such a manner as to have larger width at a base portion (on the side of frame 4) than the width at the top end. While another method of downsizing the viscoelastic body 11 is conceivable, instead of the method of narrowing the shape of the protrusion portion 6 as it extends to the inside. The method of downsizing the viscoelastic body 11 is adopted for making the size of the portion small for attaching viscoelastic body 11 to the top end of the protrusion portion 6 (for concentrating strain to the viscoelastic body 11), thereby the strain is concentrated on the viscoelastic body 11.

Figure 6:
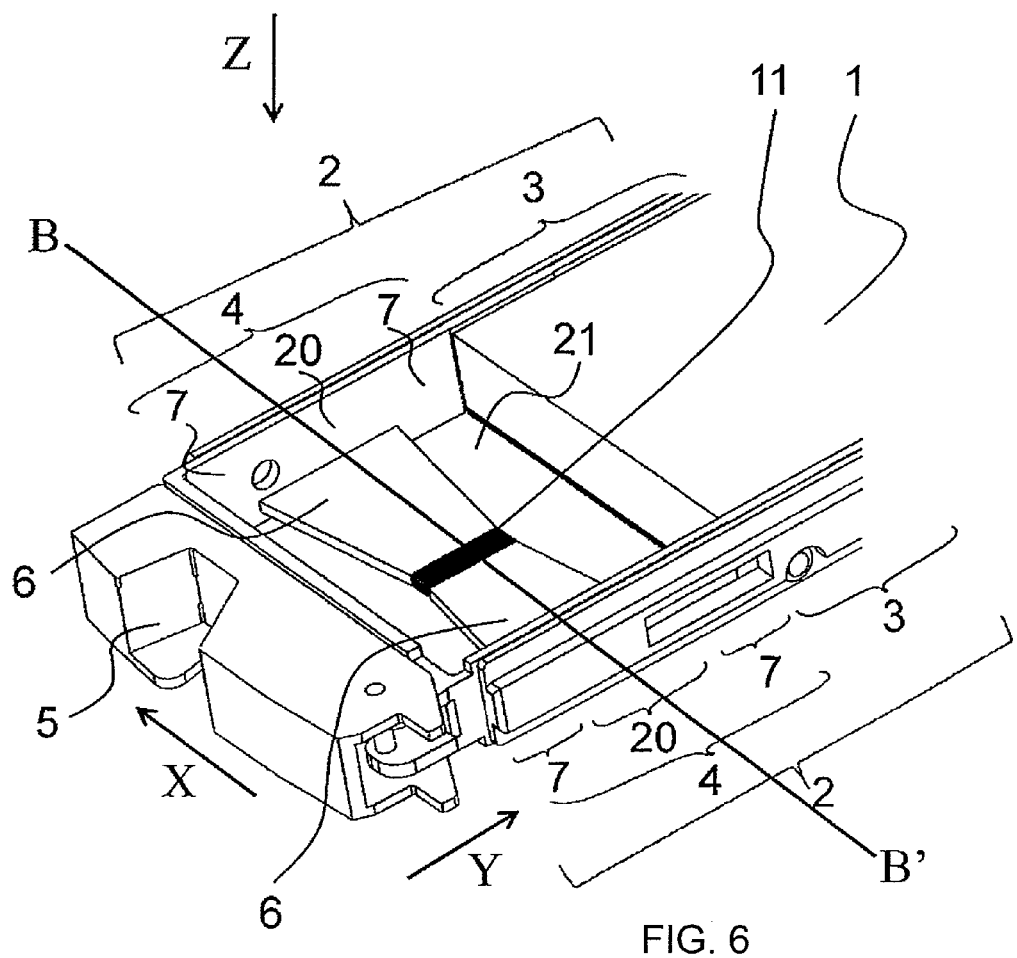
FIG. 6 is a perspective view showing a third embodiment.

The length for at least one of the two protrusions 6 in the direction X in FIG. 6 is made one-half or less of the length between the frames 4 so that the two protrusions 6 are not in contact to each other. Specifically, in the third embodiment, the two protrusions 6 and the viscoelastic body 11 are arranged such that they are substantially on one straight line.

For the viscoelastic body 11, rubber capable of obtaining a high vibration damping effect, for example, fluoro rubber is used. In this case, when the two protrusions 6 rotate against one another, like in the second embodiment, larger strain than that in the first embodiment is generated to the viscoelastic body 11, and vibrations of the HDD 1 can be decreased by the conversion of the large strain into thermal energy.

The viscoelastic body 11 is manufactured by using a die covering the entire top end of the protrusion portion 6. Since the top end of the viscoelastic body 11 has a shape covering the entire top ends of the two protrusions 6, the top ends of the viscoelastic body 11 and the top ends of the two protrusions 6 can be joined readily to improve the production efficiency.

Figure 7:
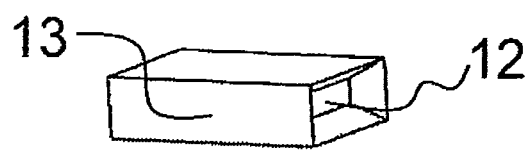
FIG. 7 shows a modification of the third embodiment showing a viscoelastic body 13.
Figure 8:
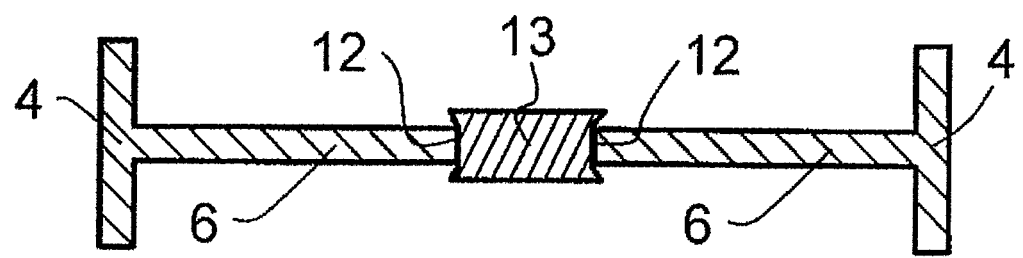
FIG. 8 shows a modification of the third embodiment along cross section B-B' in FIG. 6 as viewed in the direction Y.

A modification of the third embodiment is described with reference to FIG. 7 and FIG. 8. FIG. 7 is a schematic view showing a viscoelastic body 13 different from the viscoelastic body 11. FIG. 8 is a cross sectional view showing the state of joining the two protrusions 6 to the viscoelastic body 13.

As shown in FIG. 7, the viscoelastic body 13 is formed as a block in which concaves 12 are formed to the lateral sides thereof. The shape at the bottom of the concave 12 is substantially similar to the shape of the top end face of the protrusion portion 6. For the viscoelastic body 13, rubber capable obtaining a high damping effect, for example, fluoro rubber is used as in the case of the viscoelastic body 11.

Since the viscoelastic body 13 is the block in shape, it can be manufactured readily by casting a material into an injection molding die. The viscoelastic body 13 is sandwiched between the respective top ends of the two protrusions 6, and the viscoelastic body 13 and the two protrusions 6 are joined.

Since the viscoelastic body 13 is sandwiched between the two protrusions 6, the viscoelastic body 13 can be replaced at any time and the material for the viscoelastic body 13 can be selectable depending on the state of use. The viscoelastic body 13 may also be bonded to the two protrusions 6.

Figure 9:
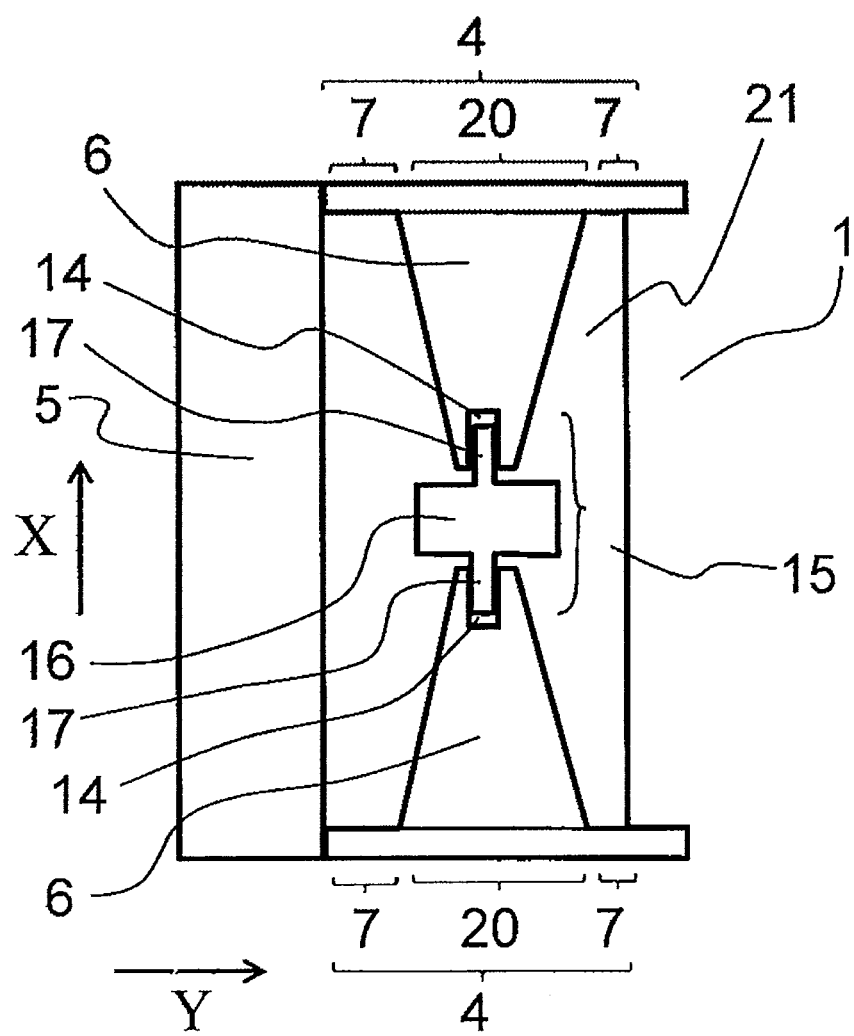
FIG. 9 is a schematic view showing a modification of the third embodiment.

A modification of the third embodiment is described with reference to FIG. 9. FIG. 9 is a view as viewed in the direction Z.

In FIG. 9, a groove 14 is formed to the top end of each of the two protrusions 6. A viscoelastic body 15 includes a flange 16 and insertion portions 17 fitting complementarily to the grooves 14 in the two protrusions 6. The flange 16 is formed larger than the insertion portion 17. Vibrations of a HDD 1 can be decreased by forming the size of the flange 16 larger than the insertion portion 17 and generating a large strain at a portion where the insertion portion 17 is joined to the flange 16 (boundary between the insertion portion 17 and the flange 16).

Vibrations of the HDD 1 can be decreased by changing the size of the flange 16 and the insertion portion 17 at the portion (boundary) and controlling the dimensional tolerance for the portion thereby generating a large strain at the portion, that is, vibrations of the HDD 1 can be decreased by conducting necessary minimum control.

This example has a structure of inserting the insertion portion 17 into the groove 14 thereby joining the viscoelastic body 15 and the each of the top ends of the two protrusions 6. Further, the insertion portion 17 and the groove 14 may also be bonded by casting an adhesive into the groove 14.

For the viscoelastic body 15, rubber capable of obtaining a high damping effect, for example, fluoro rubber is used as in the same manner as the viscoelastic body 11. When manufacturing the viscoelastic body 15, the viscoelastic body 15 can be manufactured readily by casting the material into an injection molding die. The flange 16 and the insertion portion 17 may be manufactured integrally, or they may be manufactured by bonding the insertion portion 17 to the flange 16.

The present invention is not restricted to the first to third embodiments described above but may include various modification examples. For example, the first to third embodiments have been described specifically for simple explanation of the present invention; nonetheless, the invention is not always restricted to those embodiments that include all of the constituent factors described above.

Further, a part of the configuration of an embodiment may be replaced with a configuration of other embodiment. Furthermore, a configuration of an embodiment may be added to a configuration of other embodiment. Even further, for a part of the configuration in each of the embodiments, other configuration may be added, deleted or replaced.

What is claimed is:

1. A storage device having a plurality of recording devices mounted therein, the storage device comprising:
   a handle for inserting and withdrawing the recording device into and out of the storage device;
   two holding members each including a mounting portion where the recording device is mounted and a frame extending from the mounting portion to the handle;
   two protrusions each formed on one of the two frames, the two protrusions being formed to extend inwardly of a region surrounded by the recording device, the handle, and the two frames;
   a restriction plate disposed so as to overlap on the respective surfaces of the two protrusions; and
   a viscoelastic body disposed at the overlapping portion for joining the two protrusions and the restriction plate to one another.

2. The storage device according to claim 1, wherein
   the two protrusions are formed at positions corresponding to heights substantially equal with respect to the bottom of the region, and
   the restriction plate is disposed at the upper surface or the lower surface of the two protrusions.

3. The storage device according to claim 1, wherein
   at least one of the two protrusions is formed in such a manner as to have larger width at the bottom of the protrusion than at the top end of the protrusion.

4. A storage device having a plurality of recording devices mounted therein, the storage device comprising:
   a handle for inserting and withdrawing the recording device into and out of the storage device;
   two holding members each including a mounting portion where the recording device is mounted and a frame extending from the mounting portion to the handle;
   two protrusions each formed on one of the two frames, the two protrusions extending and overlapping to each other inwardly of a region surrounded by the recording device, the handle, and the two frames;
   a viscoelastic body disposed at the overlapping portion for joining the two protrusions to each other.

5. The storage device according to claim 4, wherein
   the two protrusions are formed at positions corresponding to heights different from each other with respect to the bottom of the region.

6. A storage device having a plurality of recording devices mounted therein, the storage device comprising:
   a handle for inserting and withdrawing the recording device into and out of the storage device;
   two holding members each including a mounting portion where the recording device is mounted and a frame extending from the mounting portion to the handle;
   two protrusions each formed on one of the two frames, the two protrusions being formed to extend inwardly of a region surrounded by the recording device, the handle, and the two frames; and
   a viscoelastic body for joining the respective top ends of the two protrusions to each other.

7. The storage device according to claim 6, wherein
   the viscoelastic body comprises a block shape body having a concave formed in the surface of the block shape body facing a surface of each of the top ends of the two protrusions, and
   the shape of the surface at the top end of each of the protrusions is substantially similar to the shape of the concave.

8. The storage device according to claim 6, wherein
   the two protrusions are each formed with a groove at each top end thereof, and
   the viscoelastic body comprises an insertion portion fitted complementarily to the groove, and a flange formed to have a size larger than that of the insertion portion.

9. The storage device according to claim 6, wherein
   the two protrusions are formed at positions corresponding to heights substantially equal with respect to the bottom of the region.

* * * * *